US009020940B2

(12) United States Patent
Kononenko et al.

(10) Patent No.: US 9,020,940 B2
(45) Date of Patent: Apr. 28, 2015

(54) METHOD AND DEVICE FOR MODIFYING META DATA OF MEDIA OBJECTS

(75) Inventors: Oleksandr Kononenko, Helsinki (FI); James Francis Reilly, Helsinki (FI); Toni Strandell, Helsinki (FI); Davin Wong, Helsinki (FI)

(73) Assignee: Nokia Corporation, Espoo (FI)

( * ) Notice: Subject to any disclaimer, the term of this patent is extended or adjusted under 35 U.S.C. 154(b) by 779 days.

(21) Appl. No.: 12/672,142

(22) PCT Filed: Aug. 7, 2007

(86) PCT No.: PCT/IB2007/002269
§ 371 (c)(1),
(2), (4) Date: Jun. 28, 2011

(87) PCT Pub. No.: WO2009/019523
PCT Pub. Date: Feb. 12, 2009

(65) Prior Publication Data
US 2012/0078898 A1    Mar. 29, 2012

(51) Int. Cl.
*G06F 7/00* (2006.01)
*G06F 17/30* (2006.01)
(52) U.S. Cl.
CPC ................. *G06F 17/30041* (2013.01)
(58) Field of Classification Search
CPC ............... H04N 2201/3253; H04N 2201/0084
See application file for complete search history.

(56) References Cited

U.S. PATENT DOCUMENTS

| 6,885,874 | B2 * | 4/2005 | Grube et al. | 455/520 |
| 7,327,390 | B2 * | 2/2008 | Gallagher | 348/224.1 |
| 7,694,148 | B2 * | 4/2010 | Cheng et al. | 713/183 |
| 2004/0150726 | A1 * | 8/2004 | Gallagher | 348/222.1 |
| 2005/0125673 | A1 | 6/2005 | Cheng et al. | |
| 2008/0118100 | A1 * | 5/2008 | Hayashi | 382/100 |
| 2009/0172408 | A1 * | 7/2009 | Cheng et al. | 713/183 |
| 2011/0217965 | A1 * | 9/2011 | Lee et al. | 455/414.3 |
| 2012/0154605 | A1 * | 6/2012 | Madhav | 348/207.1 |

OTHER PUBLICATIONS

Appcid, "Photo GPS Editor", Oct. 22, 2011.*
"PhotoGPSEditor", Jul. 21, 2010.*
Derrick Story, "Working with Places", Apr. 17, 2009.*
Office Action dated Jun. 15, 2011 for Chinese Application No. 200780100162.0, including English translation, 9 pages.

* cited by examiner

*Primary Examiner* — Binh V Ho
(74) *Attorney, Agent, or Firm* — Locke Lord LLP

(57) ABSTRACT

A method for handling meta data of media objects, comprising creating a media object at a mobile electronic device, obtaining at least one rule defining modifications for positional data relating to at least one geographical area, determining positional data relating to the current geographical position of said mobile electronic device, applying said at least one rule to said positional data to derive positional meta data if said positional data relate to said at least one geographical area, deriving positional meta data from said determined positional data if said determined positional data do not relate to said at least one geographical area, and associating said positional meta data with said media object. An electronic device capable of performing the method is also provided.

33 Claims, 2 Drawing Sheets ion data to produce media
METHOD AND DEVICE FOR MODIFYING META DATA OF MEDIA OBJECTS The present invention relates to a method and device for modifying meta data associated to media objects. It particularly relates to rule-base modifying of positional meta data of media objects recorded with mobile electronic devices.

Media object formats allow media objects to be keyworded and tagged with a variety of attributes. In addition, media object repositories may allow media objects to be tagged, for example when they are published or edited later. As devices such as digital cameras, phones, Digital Video Recorders (DVR), etc. begin to get equipped with geopositioning capabilities, features are added to digital recording devices to automatically associate geoposition data to produced media objects.

Media object formats may allow location data to be part of a media object. Tags with location data may also be associated with media objects as well (i.e. geo tagging). When electronic devices have integrated location features, location data may be automatically added to media objects and/or tags associated with media objects. Global Positioning System (GPS) accuracy is in the order of tens of meters and so is quite precise.

The prior art does not provide any means for allowing users to control which positional meta data are associated to media objects and/or how these positional meta data are handled.

SUMMARY OF THE INVENTION

According to a first aspect of the invention a method is provided, comprising
  creating a media object at a mobile electronic device;
  obtaining at least one rule defining modifications for positional data relating to at least one geographical area;
  determining positional data relating to the current geographical position of said mobile electronic device;
  applying said at least one rule to said positional data to derive positional meta data if said positional data relate to said at least one geographical area;
  deriving positional meta data from said determined positional data if said determined positional data do not relate to said at least one geographical area; and
  associating said positional meta data with said media object.

When tagging media objects such as pictures taken with a digital camera with positional meta data, a user may not always want the positional meta data to be (too) exact. For example the user may want to avoid tagging photographs of his house with the exact geographical location thereof, in order to protect his privacy. This is particularly true when publishing such pictures, e.g. using an Internet media sharing service. However, on the other hand the user may want other pictures, e.g. from a vacation trip to a foreign country, to comprise the exact locations where the pictures were taken. Therefore the invention enables the user to make use of rules defining modifications for positional data relating to certain geographical areas.

According to an exemplary embodiment
  said at least one rule defines replacement data for positional data relating to a pre-determined geographical area; and
  applying said rule comprises replacing said determined positional data with said replacement data.

A user may want to replace certain positional data, e.g. the location of his home or working place, by other positional data. This may include using only the city the respective location belongs to, the country or any other more or less accurate replacement data. Replacement positional data may also include a kind of label, like "my home" or "the office" not revealing positional data the user may not want to share with others.

According to an exemplary embodiment
  said at least one rule defines a pre-determined accuracy for positional data relating to a pre-determined geographical area; and
  applying said rule comprises reducing the accuracy of said determined positional data to said pre-determined accuracy.

This is another alternative for protecting a user's privacy, i.e. reducing the accuracy of the positional data included in positional meta data. Instead of the exact position, e.g. "+60.16667, +24.9214" (e.g. GPS decimal coordinates) the positional meta data could only comprise e.g. "center='+60.17, +24.92', 'radius=2 km'", or the GPS coordinate of some commonly recognizable center point of a city (e.g. Helsinki train station), or "Helsinki, Finland", or just "Finland". In case of position determination using a cellular communication system it may be sufficient to only indicate the current cell of the mobile device.

Another example for providing coordinates with reduced accuracy is replacing the exact coordinates like 48° 07' 10.9" N 11° 36' 42.4" E with coordinates wherein the seconds or minutes are not given precisely but as an interval including the accurate position, like 48° 07' [0-60]" N 11° 36' [0-60]" E or generally 48° 07' [x1-x2]" N 11° 36' [y1-y2]" E.

In any case care has to be taken in providing these coordinates with reduced accuracy with respect to how the coordinates are made more inaccurate. It is apparently not desirable to enable someone to derive the reduced values from the exact values in a manner that can easily be anticipated. For example, the above mentioned center point must not be the exact location, and the interval x1-x2/y1-y2 must not be centered on the exact value. Otherwise persons that should not know the exact coordinates could easily derive them even from the reduced accuracy values. This could be avoided e.g. by using a pseudo-random generator or like for deriving the "boundary" values for the inaccurate centered/interval coordinates.

According to an exemplary embodiment
  said at least one rule defines an exclusion for positional data relating to a pre-determined geographical area; and
  applying said rule comprises excluding said determined positional data from said positional meta data.

In this alternative embodiment the rule may define geographical areas where no positional meta data at all shall be associated with created media objects, or in other words "empty" positional meta data will be created.

According to an exemplary embodiment
  applying said rule comprises associating said at least one rule with said media object.

In this embodiment positional meta data can be stored that is not modified, i.e. contains the original exact position, but in case a rule applies to the positional data this rule can itself be associated with the media object, e.g. by embedding it therein. This could for example be used for storing the media object with the original positional data as meta data, and only performing the modifying before transmitting or storing the media object later on. Another possibility is, for example when the media object is transmitted to a trusted media sharing service, to embed the rule in the media object such that the media sharing service can apply it to the media object.

According to an exemplary embodiment said at least one rule is obtained from a user of said mobile electronic device.

According to an exemplary embodiment obtaining said at least one rule comprises receiving said at least one rule.

This embodiment allows sharing rules, for example user-created rules, between multiple devices/persons. An example could be a family sharing the rules between the family members.

According to an exemplary embodiment the method comprises
  indicating to a user of said mobile electronic device if more than one rule relates to the geographical area of said determined positional data;
  receiving a user input selecting one rule;
wherein said selected rule is used as said at least one rule.

In case more than one rule relates to the current position, the user is prompted to indicate which rule is to be used. This embodiment is to be understood as also including a case where the user chooses to apply an "empty" rule, i.e. not altering the positional data at all, or in other words choosing not to apply one or more rules.

According to an exemplary embodiment the method comprises
  selecting the rule defining the strongest modification of said determined positional data if more than one rule relates to the geographical area of said determined positional data;
wherein said selected rule is used as said at least one rule.

In case more than one rule relates to the current position the rule defining the strongest modification, or in other words applying the highest level of privacy protection, can be selected automatically. In other embodiments the rule constituting the weakest modification can be selected.

According to an exemplary embodiment the method comprises
  storing and/or transmitting said media object and said associated positional meta data.

The positional meta data can be stored and/or transmitted comprising an association or link to the associated data, or the positional meta data can be integrated into the media object itself, e.g. by embedding it therein.

According to an exemplary embodiment said modifications defined by said at least one rule are entity-specific modifications, the method further comprising:
  detecting an access to said media object by an entity;
  providing said media object with said associated positional meta data to said entity;
wherein said applying of said at least one rule is performed responsive to said detected access and based on said entity.

The invention also allows using entity-specific modifications, e.g. the level of accuracy of the shown location might depend on the viewer. An example for this could be that family members and close friends are provided with the exact location, whereas other people only see modified location data. Mobile device contact data, i.e. phone book and group data, could be used to create appropriate location accuracy profiles and set different levels of accuracy for each profile/group/contact, if needed. For example un-modified exact location data for members of the "family" contact group, reduced accuracy location data for other entries within a phone book, and excluding the positional data altogether for any unknown entity.

It is to be noted that in this embodiment the actual modification of positional meta data is performed upon the detected access by the entity. The media object can in this case already be stored together with the exact positional data at which it was created, and the modification and association with the media object will occur in an "on-the-fly" manner before providing the media object and positional meta data to the accessing entity. The access could e.g. be performed via a Bluetooth or other wired or wireless connection to the device having the media object. In case of Bluetooth the unique ID could be used to identify an accessing entity like another user's mobile phone.

The term "providing" said media object is to be understood as including transmitting, storing and/or presenting the media object. Transmitting could be performed via a wireless connection between two mobile phones, storing could be performed to a storage medium such as Universal Serial Bus (USB) memory sticks, and presenting could be done via the display of a laptop or handheld computer. Identifying the entity desiring access to the media object can be achieved via device identification such as a Bluetooth identifier (ID), the name or hardware ID of a connected storage medium, and in case of visual presentation on a display screen via username and password of a user wishing to view the media object.

According to an exemplary embodiment said positional meta data correspond to
  Exchangeable Image File Format, EXIF;
  International Press Telecommunications Council, IPTC, standard;
  Extensible Metadata Platform, XMP;
  NewsML;
  Universal Transverse Mercator Projection, UTM;
  National Grid; or
  Irish Grid.

According to the invention the positional data within the positional meta data can be compliant with any positional data system. Examples for such systems are UTM, National grid or Irish Grid. Universal Transverse Mercator Projection (UTM) is used as the mapping standard in most of Europe. National Grid is used in the United Kingdom (UK) and Irish grid is used in Ireland.

According to an exemplary embodiment said media object comprises at least one of
  a still image;
  a video recording;
  a data recording; and
  an audio recording.

An example for a data recording could be data recorded from body sensors, e.g. heart rate, body temperature or blood pressure. Generally, the invention is not restricted to any particular type of media object, but can be applied to any media (or generally data) object that is to be tagged with positional data.

According to a second aspect of the invention a computer program product is provided, comprising program code for carrying out the method described above when said program product is run on an electronic device. In an exemplary embodiment the computer program product is stored on a computer-readable medium.

According to a third aspect of the invention a mobile electronic device is provided, comprising
  an interface adapted for receiving positional data;
  a recording component adapted for creating a media object;
  a controller adapted for obtaining at least one rule defining modifications for positional data relating to at least one geographical area, determining positional data relating to the current geographical position of said mobile electronic device, applying said at least one rule to said positional data to derive positional meta data if said positional data relate to said at least one geographical area, and deriving positional meta data from said determined positional data if said determined positional data do not relate to said at least one geographical area, and associating said positional meta data with said media object.

According to an exemplary embodiment said at least one rule defines replacement data for positional data relating to a pre-determined geographical area; and said controller is adapted for applying said at least one rule by replacing said determined positional data with said replacement data.

According to an exemplary embodiment said at least one rule defines a pre-determined accuracy for positional data relating to a pre-determined geographical area; and said controller is adapted for applying said at least one rule by reducing the accuracy of said determined positional data to said pre-determined accuracy.

According to an exemplary embodiment said at least one rule defines an exclusion for positional data relating to a pre-determined geographical area; and said controller is adapted for applying said at least one rule by excluding said determined positional data from said positional meta data.

This can for example be accomplished by generating the positional meta data as "empty" or "dummy" kind of data.

According to an exemplary embodiment said controller is adapted for associating said at least one rule with said media object.

According to an exemplary embodiment the device comprises a user interface;

wherein said controller is adapted for obtaining said at least one rule via said user interface from a user of said mobile electronic device.

According to an exemplary embodiment the device comprises an interface adapted for receiving and/or transmitting said at least one rule.

This interface can be any suitable kind of data interface, including but not limited to Universal Serial Bus, Wireless Local Area Network WLAN, Bluetooth, General Packet Radio Service GRPS etc.

According to an exemplary embodiment the device comprises a user interface;

wherein said controller is adapted for indicating to a user of said mobile electronic device if more than one rule relates to the geographical area of said determined positional data, receiving a user input selecting one rule via said user interface, and using said selected rule as said at least one rule.

According to an exemplary embodiment said controller is adapted for selecting the rule defining the strongest modification if more than one rule relates to the geographical are of said determined positional data, and using said selected rule as said at least one rule.

According to an exemplary embodiment the device comprises a memory component adapted for storing media objects and said associated positional meta data.

This can be an internal flash memory or hard disk or any other suitable memory component.

According to an exemplary embodiment the device comprises an interface adapted for transmitting media objects and associated positional meta data.

This interface can be any suitable kind of data interface, including but not limited to Universal Serial Bus, Wireless Local Area Network WLAN, Bluetooth, General Packet Radio Service GBPS etc.

According to an exemplary embodiment said modifications defined by said at least one rule are entity-specific modifications, wherein said controller is adapted for detecting an access to said media object by an entity, applying said at least one rule responsive to said detected access and based on said entity, and providing said media object with said associated positional meta data to said entity.

According to an exemplary embodiment said positional meta data correspond to

Exchangeable Image File Format, EXIF;

International Press Telecommunications Council, IPTC, standard;

Extensible Metadata Platform, XMP;

NewsML;

Universal Transverse Mercator Projection, UTM;

National Grid; or

Irish Grid.

According to an exemplary embodiment said interface adapted for receiving positional data comprises at least one of a Global Positioning System, GPS, receiver;

a Galileo positioning system receiver; and a cellular communications interface.

According to an exemplary embodiment said recording component comprises at least one of a still image camera;

a video camera; and an audio recorder.

According to a fourth aspect of the invention a module is provided, comprising an interface adapted for receiving positional data;

a controller adapted for obtaining at least one rule defining modifications for positional data relating to at least one geographical area, applying said at least one rule to said positional data to derive positional meta data if said positional data relate to said at least one geographical area, and deriving positional meta data from said determined positional data if said determined positional data do not relate to said at least one geographical area.

This module can be understood as a kind of "filter" component, to be used in mobile electronic devices for filtering the generation of positional meta data. Or generally speaking, it can be understood as an accessory module for mobile electronic devices providing positional meta data, wherein the positional meta data are being filtered in order not to reveal any sensitive position data. The module can include an interface to a position detection component such as a GPS mouse, or it can also comprise an integrated location component, i.e. a GPS receiver module or like.

According to an exemplary embodiment the module further comprises an interface for providing said positional meta data.

The module can be integrated in a mobile electronic device, in which case this interface could be an internal wired connection, or it can be an external accessory module, connected with a mobile device via a wired or wireless connection, like USB, Bluetooth or like.

According to an exemplary embodiment said at least one rule defines replacement data for positional data relating to a pre-determined geographical area; and said controller is adapted for applying said at least one rule by replacing said determined positional data with said replacement data.

According to an exemplary embodiment said at least one rule defines a pre-determined accuracy for positional data relating to a pre-determined geographical area; and said controller is adapted for applying said at least one rule by reducing the accuracy of said determined positional data to said pre-determined accuracy.

According to an exemplary embodiment said at least one rule defines an exclusion for positional data relating to a pre-determined geographical area; and said controller is adapted for applying said at least one rule by excluding said determined positional data from said positional meta data.

BRIEF DESCRIPTION OF THE DRAWINGS

The invention can be more fully understood by the following detailed description of exemplary embodiments, when also referring to the drawings, which are provided in an exemplary manner only and are not intended to limit the invention to any particular embodiment illustrated therein. In the drawings

DETAILED DESCRIPTION

Figure 1:
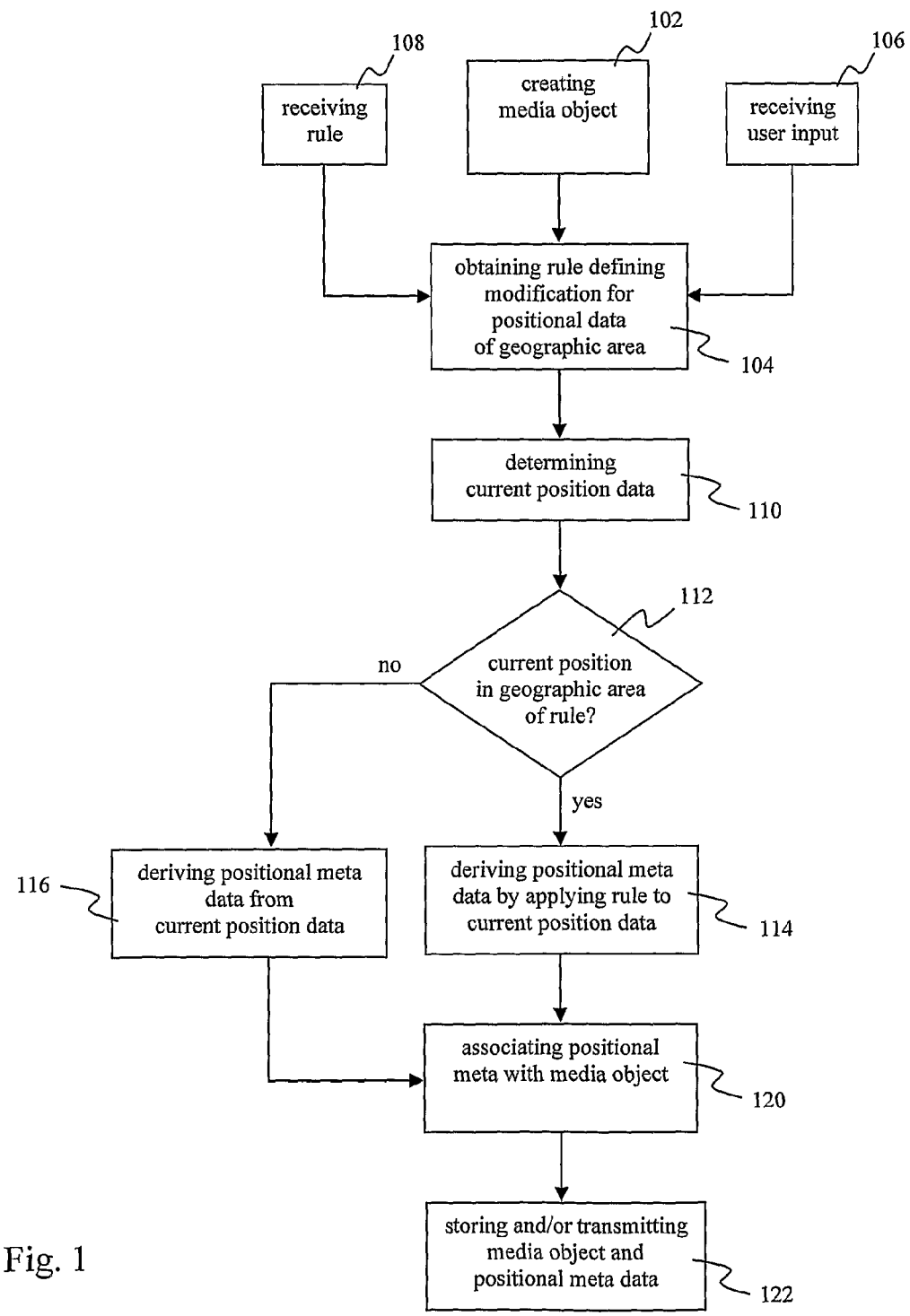
FIG. 1 is a flow diagram illustrating an exemplary embodiment of the method of the invention.

Users may generally wish to use geo tagging features, but to disallow, filter, reduce the accuracy, or otherwise manipulate the location data for created media objects or meta data at defined locations. Users may additionally wish to define such settings for others to use; one example could be a family or another cohabiting group.

For example the Exchangeable Image Format (EXIF) and International Press Telecommunications Council (IPTC) formats allow many types of name/value attributes to be added to image media objects. In addition, media object repositories may allow media objects to have textual (or other) tags associated to them, for example when they are published on the Internet or edited later. When geographic tags (such at latitude and longitude) are attached as tags, this is sometimes referred to as "geo tagging".

At certain "sensitive" locations users may wish no location information to be attached, less accurate or otherwise modified, filtered or manipulated information (e.g. strings like city, state or country) to be used instead of the original precise location data.

A user defines a set of geographic areas and a set of rules for handling of attached location information for recorded or published media objects, especially for location data attached to a media object or associated tag in general, or location data attached to a media object or associated tag that is (or may at some future time become) visible to others.

When the device knows its location, and recognizes that it is within those defined areas, it uses the defined rules for manipulating location information it attaches to recorded or published media objects and/or associated meta data. Such a set of rules may be shared between one or more devices of other users. One example group is a family, where it is also likely that at least most of the sensitive areas will be common between family members.

Such a rule based system can be used for automatically modifying filtering, editing, or manipulation of recorded media objects or related metadata within defined locations. The user could define one or more bounding boxes with associated rules or filters for recording media objects (videos, still images, voice clips, etc.). An exemplary bounding box consists of a pair of bounding GPS latitude/longitude coordinates, and a rule or filter to apply. A bounding box of the form "from={latitude1, longitude1)}, to={latitude2, longitude2}" has four corners: {latitude1, longitude1}, {latitude1, longitude2}, {latitude2, longitude1 } and {latitude2, longitude2}. It should be noted that the shape of the bounding area is not restricted to a rectangle; it can be a pentagon, polygon, circle, or an area consisting of user's freely selected corners. A rectangle is used here only as an example, any other form of area can be used as well.

Such a bounding box with an associated rule could, for example, be of a form like:

User defined replacement rule (e.g. name/value attribute pair):

"from={latitude1, longitude1}, to={latitude2, longitude2}: location is '<replacement string>'", wherein <replacement string> might be "Helsinki", "Finland", "Schwabing, Munich", "My home", "Countryside home", "Office" etc.

User defined exclusion rule:

"from={latitude1, longitude 1}, to={latitude2, longitude2}: location is 'excluded'", wherein the positional meta data could be "unknown", "restricted", unavailable" or like.

User defined reduced accuracy rule, based on current location:

"from={latitude1, longitude1}, to={latitude2, longitude2}: location is 'City=$city( )', 'State=$state( )', 'Country=$country( )'", i.e. a position in the form of "Country, City, Street" would be reduced to "Country, City", "Country, City" would be reduced to "Country".

These could be defined textually, with a menu, graphically, etc. The device/application can also have a pre-defined set of rules that the user can tie to one or more bounding boxes, like "home location", "working place location" etc. If multiple overlapping bounding boxes are defined the user could be prompted to ask which one to use, or a user could be prevented from defining overlapping bounding boxes. The device could distinguish between cases where the bounding boxes have compatible rules, and could automatically merge results for compatible rules.

A typical use case could look like this:

The user starts to create/record a new media object. The device uses the bounding boxes to determine if the actual current location is within some bounding box or not. If not, data from the integral GPS device (or another location component as cellular positioning) is used for creating or publishing the media object with associated meta data. If the current location is within some bounding box, the corresponding rule or filter is applied when creating the positional meta data.

The user sends the settings he has created, i.e. the rules related to geographical areas, using a convenient data format, e.g. in form of a data message, to another user or user's device. The second user accepts to put the settings into use on her or his device.

The user might be using a media sharing service, where he transfers part or all of his media objects. The location publishing rules might be transmitted to the service, or embedded in each media object as further meta data. The service uses the location publishing rules to change the location information attached to the media objects when the media objects are being published. This may include to make this decision dependent on how much the method is trusted that is used for publishing. For example, an Internet media sharing service may have a user area protected by username and password, and a public area not requiring an authentication. If pictures are to be published in the protected user area, the full positional meta data can be used for the respective media objects. However, when publishing the pictures in the public area, the modification rules are applied to modify the positional meta data accordingly.

FIG. 1 is a flow diagram showing steps of an exemplary embodiment of the present invention. In step 102 a media objects is created, for example by taking a picture using a digital camera, recording a video or audio sequence. The media object is created at a mobile electronic device with location capabilities, i.e. comprising an integrated positioning receiver for the Global Positioning System GPS, a cellular positioning module, or being connected to an external positioning receiver module. An example for the latter can e.g. be a Personal Digital Assistant having an integrated GPS module, or being connected to a so-called GPS mouse via Bluetooth.

In step 104 a rule is obtained, defining modifications for positional data relating to a particular geographical area. For example a user may want to define a circular area of 5 km centered at his home in which positional data will be modified. The rule can be obtained from a user, step 106, e.g. entered via the user interface of the mobile electronic device. The rule can also be received, e.g. from another mobile electronic device, via Bluetooth, WLAN or similar wired or wireless links.

In step 110 the current position of the mobile electronic device is determined. If the current position is located within the geographical area defined by said rule, i.e. "yes" in step 112, positional meta data are derived in step 114 by applying the rule to said current positional data. For example, instead of the precise position a general indication like "Helsinki, Finland" or possibly only the part of the city including the current position is used like "Schwabing, Munich". Another example could be to leave out the street number, like "Bavaria Street" instead of "Bavaria Street 7". It should be ensured that the replacement/modification makes the modified positional "inaccurate" enough to protect the user's privacy. For example, a street having a mere ten street numbers should not be used by simply leaving out the exact street number as the accuracy is still too high, while using a particular street having some hundred street numbers will usually be inaccurate enough. Another possibility could be to replace the current positional data within a particular city with the coordinates of a somehow "central" location, like the capitol, the geographical center or like.

If the current position is found not to relate to the geographical area defined in said rule instep 112, the positional meta data are derived from the (unmodified) positional data of the current position in step 114. Either way, the process continues with step 120, where the derived positional meta data are being associated with the created media object. This may include actually embedding the meta data in the media object, or otherwise providing a unique association between the meta data and the media object, e.g. by storing a pointer in the media object pointing to the associated meta data. In step 122 the created media object is stored in a memory component, e.g. an internal flash memory or hard disk of the mobile device, and/or transmitted to be stored, e.g. at an Internet media sharing service.

The present invention includes transmitting, receiving and sharing of modification rules. An example could be a family, where the family members like mom, dad, daughter and son share the same set of modification rules (or a sub-set of rules). The common rules between the family members may include rules for the geographical vicinity of their city home and their countryside home. Each family member may have additional rules for other geographical areas, like the school of the daughter or the office of the father.

Figure 2:
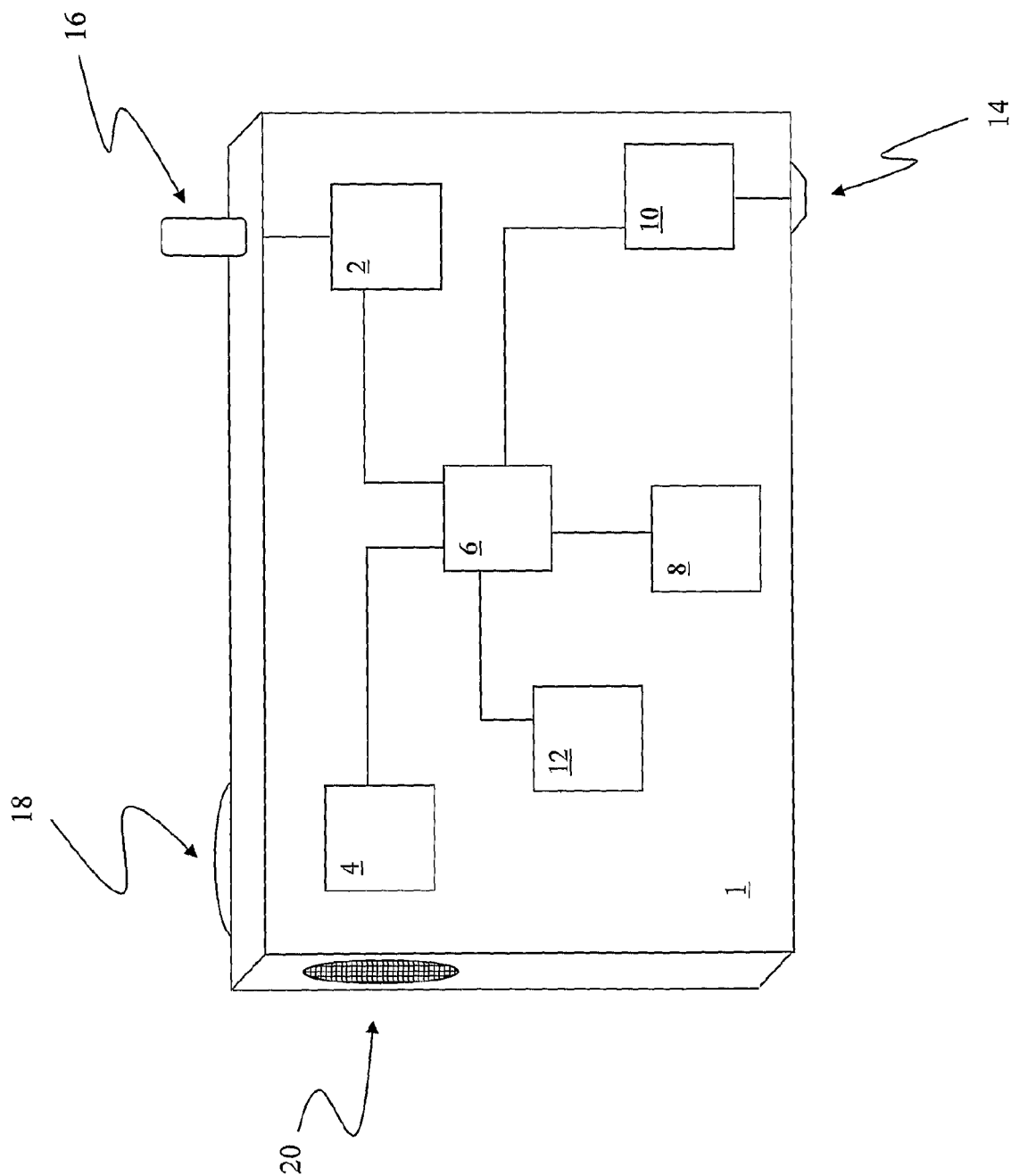
FIG. 2 is a schematic view of components of an embodiment of the device of the invention.

FIG. 2 is a schematic view of an embodiment of a mobile electronic device 1 according to the invention. The mobile electronic device 1 can be a Personal Digital Assistant (PDA), a digital camera, a video camera, and audio recorder or any other device for creating media objects such as digital pictures, videos, audio recordings and the like. In the depicted exemplary embodiment it is a PDA having a digital still picture camera 18 and a microphone 20. The device 1 comprises a location component 2, connected with an antenna 16 for receiving positional data from e.g. the GPS satellites, together forming an interface for receiving positional data. In other embodiments this interface for receiving positional data can be a Bluetooth interface connected wirelessly with a so-called GPS mouse, i.e. an external GPS receiver.

A recording component 4 is provided for creating media objects. In the depicted example it comprises a digital camera 18 and a microphone 20, therefore it is able to take still pictures and record audio. In other embodiments the recording component can have any combination of still picture camera, video camera or microphone, or even be a general data recording component, like body sensors for heart rate, temperature, blood pressure and the like. The recording component 4 is connected with a central controller 6 of the mobile device 1. A memory component 12 is provided for storing created media objects, for example a flash memory or a miniature hard disk. A user interface 8 is connected to the controller 6, for example including a keypad or full keyboard in a PDA, and a display. The user interface 8 is provided for allowing a user to control the device 1, e.g. controlling the creation of media objects. It is also provided to allow a user to input rules for modifying positional data as described above.

An interface 10 is further provided, e.g. a USB interface having a mini-USB socket 14. This interface 10 is provided for transmitting created media objects to other electronic devices like a personal computer or a mobile device of another user, or to a media sharing service, e.g. an Internet portal for sharing pictures. The interface 10 is also adapted for receiving and/or transmitting rules, for example from/to other mobile electronic devices belonging to other family members. In other embodiments this interface can be any other suitable data interface, for example Bluetooth, WLAN, Fire Wire IEEE1394, GPRS etc.

The controller 6 is adapted for performing the inventive method for modifying positional meta data. Upon the creation of a media object, e.g. taking a picture using camera 18/recording component 4 the controller determines the current geographical position of the mobile device 1, using location component 2/antenna 16. In a further step the controller 6 checks if a rule is present related to the determined current location. If so, that is, if the current position is located within a geographical area for which a corresponding rule is present, the controller 6 applies the rule to the determined positional data in order to derive positional meta data. In a further step the controller 6 stores the created media object associated with the derived positional meta data in memory component 12. It can also transmit the created media object associated with the positional meta data via interface 10/socket 14, for example when the user returns to his home and wishes to copy the created media object to his personal computer, or an Internet media sharing service.

The present invention allows the modification of positional meta data for media objects on the basis of user-definable rules, in order to protect the user's privacy. It therefore provides a comfortable way for controlling which positional meta data will be associated with media objects. This is not only comfortable, it will also prevent that any sensitive positional data is unintentionally shared with others.

The latter will most certainly happen sometime if the user can only manually switch on/off the inclusion of positional data without being reminded of the currently set mode for each media object, as users tend to forget to switch the setting. Also, even if an indication would be provided each time a media object is created (e.g. "include positional data?") it is very likely that users will soon be annoyed by this interruption and prefer to disable it, thus again being prone to forgetting to turn of the inclusion of (exact) positional data. The invention provides a much more sophisticated way of defining which positional data shall be included and how they are to be modified.

The invention claimed is:

1. A method, comprising:
    creating a media object at a mobile electronic device;
    obtaining at least one rule of obfuscation defining modifications for positional data relating to at least one geographical area;
    determining positional data relating to a current geographical position of said mobile electronic device;
    applying said at least one rule to said determined positional data to derive first positional meta data if said determined positional data relate to said at least one geographical area;
    wherein said at least one rule defines a pre-determined accuracy for positional data relating to a pre-determined geographical area; and applying said rule comprises reducing the accuracy of said determined positional data to said pre-determined accuracy;
    deriving second positional meta data from said determined positional data if said determined positional data do not relate to said at least one geographical area, wherein said first positional meta data differ from said second positional meta data by providing less accurate positional information about said current geographical position of said mobile electronic device; and
    modifying positional meta data associated with said media object by associating said derived positional meta data with said media object.

2. The method according to claim 1, wherein
    said at least one rule defines replacement data for positional data relating to a pre-determined geographical area; and
    applying said rule comprises replacing said determined positional data with said replacement data.

3. The method according to claim 1 wherein
    said at least one rule defines an exclusion for positional data relating to a pre-determined geographical area; and
    applying said rule comprises excluding said determined positional data from said first positional meta data.

4. The method according to claim 1, wherein applying said rule comprises associating said at least one rule with said media object.

5. The method according to claim 1, wherein said at least one rule is obtained from a user of said mobile electronic device.

6. The method according to claim 1, wherein obtaining said at least one rule comprises receiving said at least one rule.

7. The method according to claim 1, comprising:
    indicating to a user of said mobile electronic device if more than one rule relates to the geographical area of said determined positional data;
    receiving a user input selecting one rule;
    wherein said selected rule is used as said at least one rule.

8. The method according to claim 1, comprising:
    selecting the rule defining a strongest modification of said determined positional data if more than one rule relates to the geographical area of said determined positional data;
    wherein said selected rule is used as said at least one rule.

9. The method according to claim 1, comprising at least one of storing and transmitting said media object and said associated positional meta data.

10. The method according to claim 1, wherein said modifications defined by said at least one rule are entity-specific modifications, the method further comprising:
    detecting an access to said media object by an entity;
    providing said media object having said associated positional meta data to said entity;
    wherein said applying of said at least one rule is performed responsive to said detected access and based on said entity.

11. The method according to claim 1, wherein said first positional meta data corresponds to:
    Exchangeable Image File Format, EXIF;
    International Press Telecommunications Council, IPTC, standard;
    Extensible Metadata Platform, XMP;
    NewsML;
    Universal Transverse Mercator Projection, UTM;
    National Grid; or
    Irish Grid.

12. The method according to claim 1, wherein said media object comprises at least one of:
    a still image;
    a video recording;
    a data recording; and
    an audio recording.

13. A computer program product comprising program code stored on a non-transitory computer readable medium, which when executed by a computer processor causes an apparatus to perform the method of claim 1.

14. The method according to claim 1, wherein said second positional meta data correspond to:
    Exchangeable Image File Format, EXIF;
    International Press Telecommunications Council, IPTC, standard;
    Extensible Metadata Platform, XMP;
    NewsML;
    Universal Transverse Mercator Projection, UTM;
    National Grid; or
    Irish Grid.

15. A mobile electronic device, comprising:
    an interface configured to receive positional data relating to a current geographical position of said mobile electronic device;
    a recording component configured to create a media object; and
    a controller configured to obtain at least one rule of obfuscation defining modifications for positional data relating to at least one geographical position of said mobile electronic device, apply said at least one rule to said received positional data to derive first positional meta data if said received positional data relate to said at least one geographical area, wherein said at least one rule defines a pre-determined accuracy for positional data relating to a pre-determined geographical area; and said controller is configured to apply said at least one rule by reducing the accuracy of said determined positional data to said pre-determined accuracy; and derive second positional meta data from said received positional data if said received positional data do not relate to said at least one geographical area, wherein said first positional meta data differ from said second positional meta data by providing less accurate positional information about said current geographical position of said mobile electronic device, and modify positional meta data associated with said media object by associating said derived positional meta data with said media object.

16. The device according to claim 15, wherein
said at least one rule defines replacement data for positional data relating to a pre-determined geographical area; and
said controller is configured to apply said at least one rule by replacing said determined positional data with said replacement data.

17. The device according to claim 15, wherein
said at least one rule defines an exclusion for positional data relating to a pre-determined geographical area; and
said controller is configured to apply said at least one rule by excluding said determined positional data from said first positional meta data.

18. The device according to claim 15, wherein said controller is configured to associate said at least one rule with said media object.

19. The device according to claim 15, comprising:
a user interface;
wherein said controller is configured to obtain said at least one rule via said user interface from a user of said mobile electronic device.

20. The device according to claim 15, comprising an interface configured to perform at least one of receiving and transmitting said at least one rule.

21. The device according to claim 15, comprising:
a user interface;
wherein said controller is configured to indicate to a user of said mobile electronic device if more than one rule relates to the geographical area of said determined positional data, receive a user input selecting one rule via said user interface, and use said selected rule as said at least one rule.

22. The device according to claim 15, wherein said controller is configured to select the rule defining a strongest modification if more than one rule relates to the geographical area of said determined positional data, and use said selected rule as said at least one rule.

23. The device according to claim 15, comprising a memory component configured to store media objects and said associated positional meta data.

24. The device according to claim 15, comprising an interface configured to transmit media objects and associated positional meta data.

25. The device according to claim 15, wherein said modifications defined by said at least one rule are entity-specific modifications, and wherein said controller is configured to detect an access to said media object by an entity, apply said at least one rule responsive to said detected access and based on said entity, and provide said media object with said associated positional meta data to said entity.

26. The device according to claim 15, wherein said first positional meta data correspond to:
Exchangeable Image File Format, EXIF;
International Press Telecommunications Council, IPTC, standard;
Extensible Metadata Platform, XMP;
NewsML;
Universal Transverse Mercator Projection, UTM;
National Grid; or
Irish Grid.

27. The device according to claim 15, wherein said interface configured to receive positional data comprises at least one of:
a Global Positional System, GPS, receiver;
a Galileo positional system receiver; and
a cellular communications interface.

28. The device according to claim 15, wherein said recording component comprises at least one of:
a still image camera;
a video camera;
a data recorder; and
an audio recorder.

29. An apparatus, comprising:
an interface configured to receive positional data relating to a current geographical position of said apparatus; and
a controller configured to obtain at least one rule of obfuscation defining modifications for positional data relating to at least one geographical area, apply said at least one rule to said received positional data to derive first positional meta data if said received positional data relate to said at least one geographical area, wherein said at least one rule defines pre-determined accuracy for positional data relating to a pre-determined geographical area; and said controller is configured to apply said at least one rule by reducing the accuracy of said determined positional data to said pre-determined accuracy; and derive second positional meta data from said received positional data if said received positional data do not relate to said at least one geographical area, wherein said first positional meta data differ from said second positional meta data by providing less accurate positional information about said current geographical position of said apparatus, and modify positional meta data associated with a media object by associating said derived positional meta data with said media object.

30. The apparatus according to claim 29, further comprising an interface for providing said first and second positional meta data.

31. The apparatus according to claim 29, wherein
said at least one rule defines replacement data for positional data relating to a pre-determined geographical area; and
said controller is configured to apply said at least one rule by replacing said determined positional data with said replacement data.

32. The apparatus according to claim 29, wherein
said at least one rule defines an exclusion for positional data relating to a pre-determined geographical area; and
said controller is configured to apply said at least one rule by excluding said determined positional data from said first positional meta data.

33. An apparatus, comprising:
means for creating a media object at a mobile electronic device;
means for obtaining at least one rule of obfuscation defining modifications for positional data relating to at least one geographical area;
means for determining positional data relating to a current geographical position of said mobile electronic device;
means for applying said at least one rule to said determined positional data to derive first positional meta data if said determined positional data relate to said at least one geographical area;
wherein said at least one rule defines a pre-determined accuracy for positional data relating to a pre-determined geographical area; and applying said rule comprises reducing the accuracy of said determined positional data to said pre-determined accuracy;

means for deriving second positional meta data from said determined positional data if said determined positional data do not relate to said at least one geographical area, wherein said first, positional meta data differ from said second positional meta data by providing less accurate positional information about said current geographical position of said mobile electronic device; and means for modifying positional meta data associated with said media object by associating said derived positional meta data with said media object.

\* \* \* \* \*